(12) United States Patent
Okamoto et al.

(10) Patent No.: US 9,115,895 B2
(45) Date of Patent: Aug. 25, 2015

(54) FLUE GAS DESULFURIZATION

(71) Applicant: MITSUBISHI HEAVY INDUSTRIES, LTD., Tokyo (JP)

(72) Inventors: Takuya Okamoto, Tokyo (JP); Tatsuto Nagayasu, Tokyo (JP); Satoshi Nakamura, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 18 days.

(21) Appl. No.: 13/662,661

(22) Filed: Oct. 29, 2012

(65) Prior Publication Data
US 2013/0108535 A1    May 2, 2013

(30) Foreign Application Priority Data

Oct. 31, 2011    (JP) .................................. 2011-239635

(51) Int. Cl.
*B01D 53/50* (2006.01)
*F23J 15/04* (2006.01)
(Continued)

(52) U.S. Cl.
CPC .............. *F23J 15/04* (2013.01); *B01D 53/501* (2013.01); *B01D 53/78* (2013.01); *B01D 53/80* (2013.01); *B01D 53/502* (2013.01);
(Continued)

(58) Field of Classification Search
CPC .... B01D 53/501; B01D 53/502; B01D 53/78; B01D 53/80; F23J 15/04
USPC .................................. 422/111, 168, 169, 172
See application file for complete search history.

(56) References Cited

U.S. PATENT DOCUMENTS 4,305,909 A    12/1981    Willett et al.
4,328,195 A     5/1982    Mori et al.
(Continued)

FOREIGN PATENT DOCUMENTS

AU    674822 B1    1/1997
CN    1304328 A    7/2001
(Continued)

OTHER PUBLICATIONS

Extended European Search Report dated Jan. 24, 2013, issued in corresponding European Patent Application No. 12190312.4 (8 pages).
(Continued)

*Primary Examiner* — Jill Warden
*Assistant Examiner* — Joye L Woodard
(74) *Attorney, Agent, or Firm* — Westerman, Hattori, Daniels & Adrian, LLP

(57) ABSTRACT

A flue gas desulfurization according to the present invention includes a desulfurization absorber that removes SOx and dust contained in flue gas, spray pipes that are provided in the desulfurization absorber, an absorbent feeding means that feeds an absorbing-agent-slurry containing absorbent, in which limestone is used as an absorbing agent, into the desulfurization absorber, nozzles that are provided in the spray pipe to spray the absorbent into the desulfurization absorber, an alkaline-agent feeding means that feeds an alkaline-agent containing solution into the desulfurization absorber, and an waste-water discharge pipe for discharging filtrate obtained by solid-liquid separating the absorbent discharged from the desulfurization absorber as waste water. A feed amount of the alkaline-agent containing solution into the desulfurization absorber is adjusted based on a discharge amount of the waste water.

1 Claim, 3 Drawing Sheets

(51) Int. Cl.
*B01D 53/78* (2006.01)
*B01D 53/80* (2006.01)

(52) U.S. Cl.
CPC .... *B01D 2251/206* (2013.01); *B01D 2251/304* (2013.01); *B01D 2251/306* (2013.01); *B01D 2251/402* (2013.01); *B01D 2251/404* (2013.01); *B01D 2257/404* (2013.01); *B01D 2257/504* (2013.01); *B01D 2258/0283* (2013.01); *F23J 2215/20* (2013.01); *F23J 2219/50* (2013.01)

(56) References Cited

U.S. PATENT DOCUMENTS

| | | | |
|---|---|---|---|
| 4,366,133 | A | 12/1982 | Rader et al. |
| 4,491,461 | A | 1/1985 | Hoekstra |
| 4,696,804 | A | 9/1987 | Shinoda et al. |
| 4,837,001 | A | 6/1989 | Miller |
| 5,192,518 | A | 3/1993 | Ukawa et al. |
| 5,770,161 | A * | 6/1998 | Ochi et al. ............ 422/111 |
| 6,051,055 | A | 4/2000 | Ukawa et al. |
| 2002/0168311 | A1 | 11/2002 | Takashina et al. |

FOREIGN PATENT DOCUMENTS

| | | |
|---|---|---|
| CN | 101780370 A | 7/2010 |
| CN | 101874975 A | 11/2010 |
| EP | 0 937 491 A2 | 8/1999 |
| JP | 2001-170444 A | 6/2001 |

OTHER PUBLICATIONS

Mexican Decision of Patent Grant dated Oct. 13, 2014, issued in corresponding Mexican Application No. MX/a/2012/012156 (1 page).

Chinese Office Action dated Jun. 25, 2014, issued in corresponding Chinese Patent Application No. 201210408988.6 with English translation (22 pages).

Sargent & Lundy, "Flue Gas Desulfurization Technology Evaluation Dry Lime vs. Wet Limestone FGD", Mar. 2007, cited in Mexican Office Action dated Jul. 1, 2014.

"Handbook of Practical Environmental Engineering", dated Sep. 30, 2001, Zhongbiao, Wu pp. 341-343. Cited in Chinese Office Action dated Jun. 25, 2014 (with English Translation).

Office Action dated Jan. 6, 2015, issued in corresponding Chinese Application No. 201210408988.6, w/English translation. (26 pages).

"Wet FGD Design and Equipment Selection Guide" Jun. 30, 2011, Guo Jianming China Electric Power Press, pp. 309-310 (cited in Chinese Office Action dated Jan. 6, 2015).

Communication under Rule 71(3) EPC dated Mar. 10, 2015, issued in corresponding European Patent application No. 12 190 312.4. (30 pages).

* cited by examiner

FLUE GAS DESULFURIZATION

FIELD

The present invention relates to a flue gas desulfurization.

BACKGROUND

Nitrogen oxide (NOx), sulfur oxide (SOx), dust and the like generated by combustion of fossil fuel in a thermal power plant are contained in exhaust gas (flue gas). Such NOx, SOx, dust and the like cause air pollution, and therefore a NOx removal apparatus that removes NOx and a flue gas desulfurization for removing SOx are provided in a thermal power plant and the like having a coal combustion boiler. A wet limestone/gypsum method predominates in such a flue gas desulfurization installed in thermal power plants. In this technique, a spray method in which a limestone slurry is sprayed from a nozzle to bring the limestone slurry into gas-liquid contact with flue gas has high reliability, and has been frequently adopted as a spray method of the limestone slurry into a column.

In a conventional flue gas desulfurization adopting the spray method, flue gas from a boiler or the like is introduced from a gas inlet duct into an absorber, limestone as an absorbent of sulfur oxide is supplied to the desulfurization as a limestone slurry, and the absorbent is sprayed from spray nozzles installed in the absorber.

Flue gas is introduced from an opening provided on a side face or the like of the absorber to flow toward an opening provided in an upper part of a column of the absorber. An absorbent containing limestone slurry is sprayed from each nozzle installed in the absorber toward flue gas flowing in the column. Gas-liquid contact is made between flue gas supplied into the absorber and droplets of the absorbent, and SOx in flue gas is removed on the surfaces of the droplets of the absorbent along with NOx, dust, and acidic gas such as hydrogen chloride and hydrogen fluoride. Mist entrained in flue gas is removed by a mist eliminator, reheated as required, and then discharged from a stack through a gas outlet duct provided at the top of the column as clean flue gas.

The absorbent having absorbed SOx accumulates in a lower part of a main body of the absorber. SOx removed from flue gas in the absorber reacts with limestone in the absorbent to become calcium sulfite as an intermediate product. Air for oxidation is supplied to the absorber by a blower or the like, so that calcium sulfite is oxidized by oxygen in the air supplied into the absorber, thereby generating calcium sulfate (gypsum).

In a wet-type FGD (Flue Gas Desulfurization) adopting a wet-type limestone/gypsum process, the limestone reactivity decreases due to NOx, SOx, dust and the like contained in flue gas flowing into the absorber.

Therefore, for example, in the conventional flue gas desulfurization, absorbing activity of the absorbent is increased by feeding an absorbing agent having higher absorbing activity with respect to NOx, SOx, dust and the like such as magnesium hydroxide ($Mg(OH)_2$), sodium hydroxide (NaOH) or the like into a desulfurization absorber (see, for example, Patent Literature 1).

CITATION LIST

Patent Literature

Patent Literature 1: Japanese Patent Application Laid-open No. 2001-170444

SUMMARY

Technical Problem

However, in the conventional flue gas desulfurization, when flue gas having a high concentration of NOx, SOx, dust and the like is supplied into the absorber, the limestone reactivity in the absorbent decreases. Therefore, to satisfy the desulfurization performance required for purifying flue gas, limestone as the absorbing agent needs to be input excessively, thereby increasing the operation cost of a plant such as a thermal power plant.

The present invention has been achieved to solve the above problems, and an object of the present invention is to provide a flue gas desulfurization that improves the limestone reactivity efficiently and stably, reduces the operation cost of a plant, and can improve flue gas purification performance of the plant.

Solution to Problem

According to a first aspect of the present invention, there is provided a flue gas desulfurization including: a desulfurization absorber that removes sulfur oxide and dust contained in flue gas; spray pipes that are provided horizontally in the desulfurization absorber, with one end of the spray pipes being closed; an absorbent feeding unit that is connected to the other end of the spray pipes to feed an absorbent containing an absorbing agent slurry, in which limestone is used as an absorbing agent, into the desulfurization absorber; nozzles that are provided in the spray pipe to spray the absorbent into the desulfurization absorber; an alkaline-agent feeding unit that feeds a solution containing an alkaline agent into the desulfurization absorber; and an waste-water discharge pipe for discharging filtrate obtained by solid-liquid separating an absorbent discharged from the desulfurization absorber as waste water, wherein a feed amount of a solution containing the alkaline agent into the desulfurization absorber is adjusted based on a discharge amount of the waste water.

According to a second aspect of the present invention, there is provided the flue gas desulfurization according to the first aspect, wherein the alkaline agent includes at least one of sodium hydroxide, sodium sulfate, potassium hydroxide, potassium sulfate, calcium hydroxide, magnesium hydroxide, magnesium sulfate, and ammonium sulfate.

According to a third aspect of the present invention, there is provided the flue gas desulfurization according to the first or second aspect, wherein a solution containing the alkaline agent is continuously fed to the desulfurization absorber.

In addition, the present invention can be configured as follows.

That is, in the present invention, in anyone of the first to third inventions, it is preferable to provide a calcium-carbonate concentration meter in the desulfurization absorber for measuring the concentration of carbonate ions in the absorbent.

Furthermore, in the present invention, in any one of the first to third inventions, it is preferable to provide a chlorine-ion concentration meter in the desulfurization absorber for measuring the concentration of chlorine ions in the absorbent.

Advantageous Effects of Invention

According to the present invention, the limestone reactivity is improved efficiently and stably, the operation cost of a plant is reduced, and flue gas purification performance of a plant such as a thermal power plant can be improved.

DESCRIPTION OF EMBODIMENTS

Embodiments for carrying out the present invention will be explained below in detail with reference to the accompanying drawings. The present invention is not limited to the contents described in the following embodiments. Constituent elements in the embodiment include those that can be easily assumed by persons skilled in the art, that are substantially equivalent, and so-called equivalents. In addition, constituent elements disclosed in the following embodiments can be combined with each other as appropriate.

Embodiment

Figure 1:
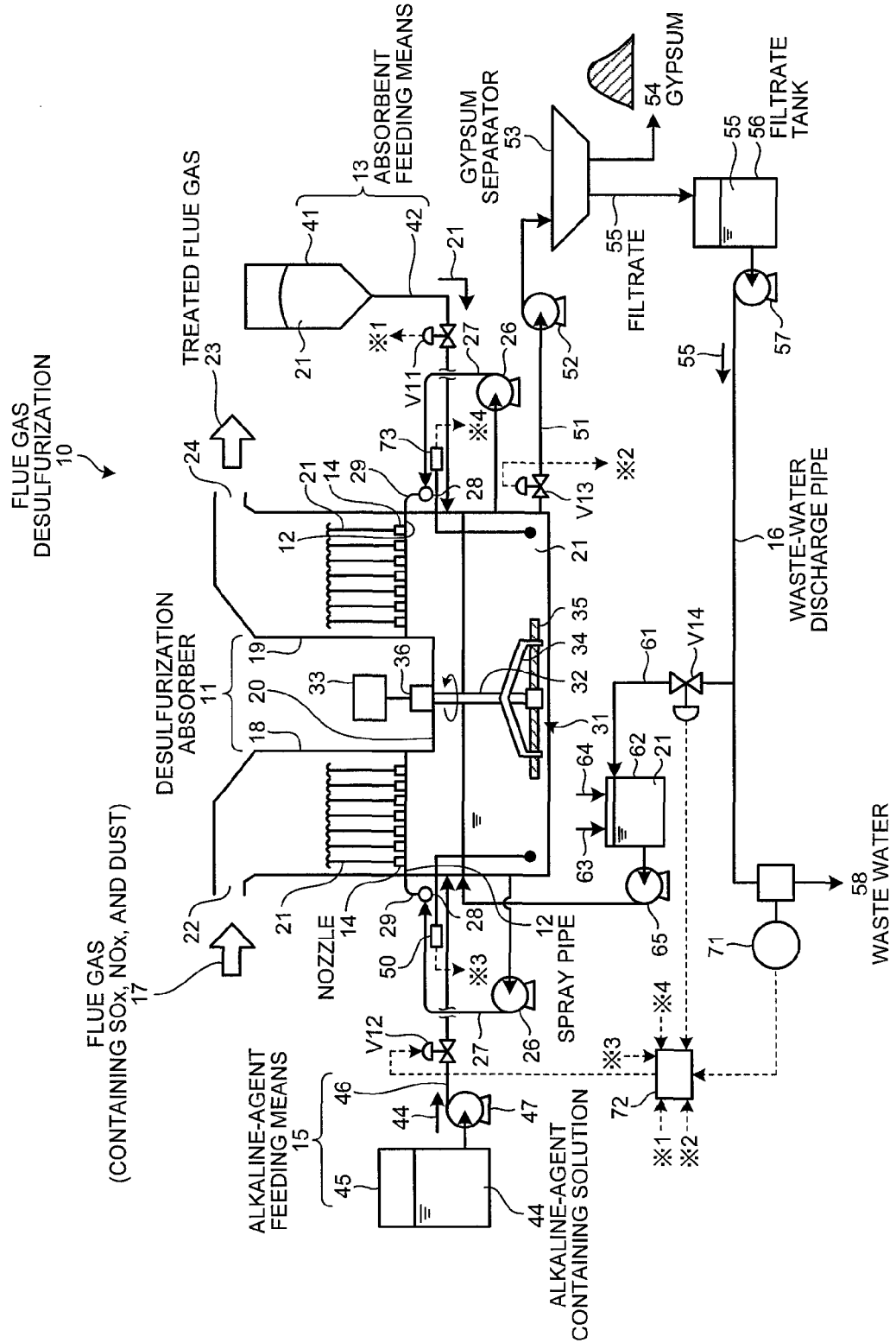
FIG. 1 is a schematic configuration diagram depicting a configuration of a flue gas desulfurization according to the present embodiment in a simplified manner.
Figure 2:
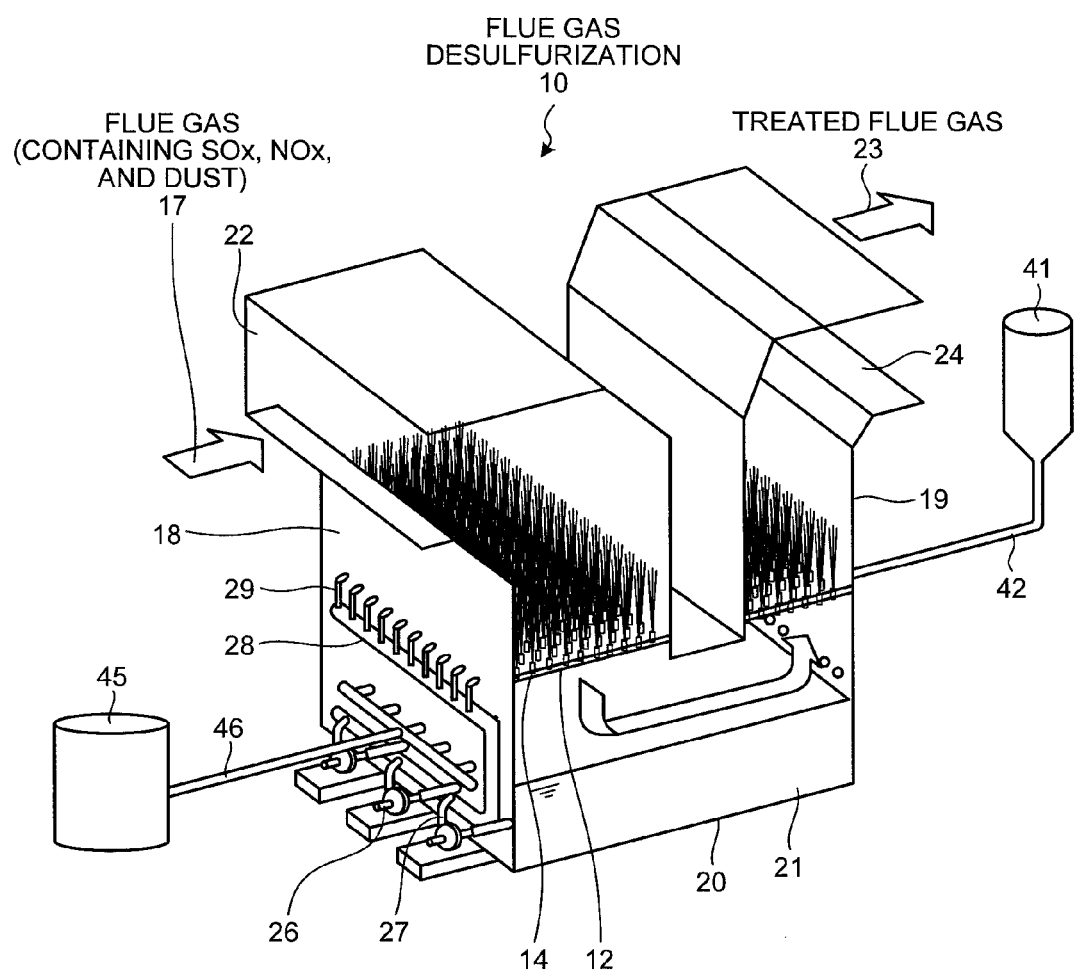
FIG. 2 is a perspective view of a desulfurization absorber.

A flue gas desulfurization according to an embodiment of the present invention is explained with reference to the drawings. FIG. 1 is a schematic configuration diagram depicting a configuration of the flue gas desulfurization according to the present embodiment in a simplified manner, and FIG. 2 is a perspective view of a desulfurization absorber. As shown in FIGS. 1 and 2, a flue gas desulfurization 10 according to the present embodiment includes a desulfurization absorber 11, a spray pipe 12, an absorbent feeding means 13, a nozzle 14, an alkaline-agent feeding means 15, and a waste-water discharge pipe 16.

Exhaust gas (flue gas) 17 containing NOx, SOx, and dust is introduced into the desulfurization absorber 11. The flue gas 17 is discharged from a coal combustion boiler or the like, and in the coal combustion boiler or the like, nitrogen and sulfur in fuel becomes NOx and SOx due to combustion, and thus the flue gas 17 contains NOx, SOx, and dust.

The desulfurization absorber 11 includes a parallel-flow desulfurization absorber (a parallel flow column) 18, a counter-flow desulfurization absorber (a counter flow column) 19, and a storage tank 20. In the desulfurization absorber 11, an absorbing-agent-slurry containing absorbent 21 in which limestone is used as an absorbing agent is brought into gas-liquid contact with the flue gas 17, and the absorbent 21 is brought into contact with air for oxidation.

In the present embodiment, the absorbing agent slurry contains calcium, and means a limestone slurry in the present embodiment.

The parallel flow column 18 is extended upward from one side of the storage tank 20 and formed in a box shape, and has an introduction opening 22 for introducing untreated flue gas 17 in an upper part thereof. The flue gas 17 is introduced into the column from the introduction opening 22, and the flue gas 17 introduced into the column flows downward of the column.

The counter flow column 19 is extended upward from the other side of the storage tank 20 and formed in a box shape, and has a discharge opening 24 for discharging treated flue gas (processed flue gas) 23 in an upper part thereof. The flue gas 17 flows upward of the storage tank 20.

The spray pipe 12 is respectively provided in a horizontal direction in the parallel flow column 18 and the counter flow column 19, and the spray pipe 12 is closed at one end thereof. Spray pipes 12 are provided parallel to each other along the horizontal direction in the column.

Each spray pipe 12 is provided with nozzles 14 that spray the absorbent 21 into the desulfurization absorber 11. The nozzles 14 are provided in each spray pipe 12 with a certain interval therebetween to spray the absorbent 21 upward in a form of a liquid column.

The desulfurization absorber 11 is provided with a circulation pump 26 that feeds the absorbent 21 in the storage tank 20 to the spray pipe 12. Each circulation pump 26 is connected to a U-shaped circulation header 28 via a feed pipe 27. Each circulation header 28 is connected to each spray pipe 12 via a connecting pipe 29.

The storage tank 20 stores therein the absorbent 21 using limestone as an absorbing agent. The absorbent 21 is replenished from the absorbent feeding means 13 to the storage tank 20 so that the absorbent 21 in the storage tank 20 is maintained at a required level, and the absorbent 21 dropped to the bottom of the parallel flow column 18 and the counter flow column 19 is stored in the storage tank 20.

An air feed device 31 is provided in the storage tank 20. The air feed device 31 is an arm rotating type, and includes a hollow rotation shaft 32 provided in the storage tank 20, a motor (a drive unit) 33 that rotates the hollow rotation shaft 32, an arm 34 supported by the hollow rotation shaft 32 in the storage tank 20 and horizontally rotated by the motor 33, an air feed pipe 35 extended from the hollow rotation shaft 32 with an open end being extended to a lower side of the arm 34, and a rotary joint 36 for supplying a base end side of the hollow rotation shaft 32 to an air source.

According to the air feed device 31, the hollow rotation shaft 32 is rotated while injecting air from the rotary joint 36, to feed air from the air feed pipe 35 into a gas phase region generated behind the arm 34 in a rotation direction and cause a breaking phenomenon of an edge of the gas phase region due to vortex force generated by the rotation of the arm 34, thereby generating a number of substantially uniform fine bubbles. Accordingly, air blown into the storage tank 20 can be efficiently brought into contact with the absorbent 21 blown up from the spray pipe 12, flowing down while absorbing SOx and NOx in the flue gas 17, and stored in the storage tank 20. Therefore, fine bubbles generated by the air feed device 31 are blown into the absorbing agent slurry in the absorbent 21, and the absorbent 21 is brought into contact with the air and oxidized, thereby generating gypsum (calcium sulfate ($CaSO_4$)) as a byproduct.

The absorbent feeding means 13 is connected to the other end of the spray pipe 12, to feed the absorbing-agent-slurry containing absorbent 21 in which limestone (calcium carbonate ($CaCO_3$)) is used as an absorbent into the desulfurization absorber 11. The absorbent feeding means 13 includes a limestone tank 41 that stores therein the absorbent 21, and an absorbent feed line 42 for feeding the absorbent 21 to the parallel flow column 18 and the counter flow column 19. The absorbent 21 in the limestone tank 41 is fed into the storage tank 20 via the absorbent feed line 42. An adjusting valve V11 is provided in the absorbent feed line 42, so that a feed amount of the absorbent 21 to be fed into the storage tank 20 is adjusted by the adjusting valve V11.

The absorbent 21 in the storage tank 20 is fed to the circulation header 28 through the feed pipe 27, respectively, by the circulation pump 26, and then fed to each spray pipe 12 in the parallel flow column 18 and the counter flow column 19 through the connecting pipe 29. The absorbent 21 fed to the spray pipe 12 is sprayed upward from the nozzles 14 provided in the spray pipe 12 in the parallel flow column 18 and the counter flow column 19, to purify the flue gas 17 by coming in gas-liquid contact with the flue gas 17.

The flue gas 17 is introduced into the parallel flow column 18 through the introduction opening 22, and falls in the parallel flow column 18. In the parallel flow column 18, the absorbent 21 fed to the spray pipe 12 is branched and fed to the respective nozzles 14 from the spray pipe 12, and sprayed upward from the respective nozzles 14. The absorbent 21 blown upward is dispersed at the top of the column, is refined, and falls. The particulate absorbing agent slurry ($CaCO_3$) contained in the flue gas 17 is dispersed and present in the parallel flow column 18. The absorbent 21 is brought into gas-liquid contact with the flue gas 17 so that SOx and NOx in the flue gas 17 are absorbed by the absorbent 21, and fine dust contained in the flue gas 17 are collected, and the absorbent 21 falls while purifying the flue gas 17.

In the parallel flow column 18, because the flue gas 17 containing sulfur dioxide flows down in a region where the particulate absorbent 21 is present, a gas-liquid contact area per volume increases. Furthermore, near the nozzles 14, the flue gas 17 is effectively entrained in the blown-up flow of the absorbent 21. Therefore, the absorbent 21 and the flue gas 17 are effectively mixed, thereby removing the most part of sulfur dioxide contained in the flue gas 17 in the parallel flow column 18.

The flue gas 17 flowing down in the parallel flow column 18 flows horizontally in the upper part of the storage tank 20, moves to the counter flow column 19, enters into the counter flow column 19 from the bottom thereof, and moves up in the counter flow column 19. In the counter flow column 19, the absorbent 21 fed to the spray pipe 12 is branched and fed to the respective nozzles 14 from the spray pipe 12, and sprayed upward from the respective nozzles 14. The absorbent 21 blown upward is dispersed at the top of the column, is refined, and falls. The particulate absorbing agent slurry ($CaCO_3$) contained in the flue gas 17 is dispersed and present in the counter flow column 19. The absorbent 21 is brought into gas-liquid contact with the flue gas 17 so that NOx and SOx are absorbed by droplet surfaces of the absorbent 21 along with dust and acidic gas such as hydrogen chloride and hydrogen fluoride in the flue gas 17, and fine dust contained in the flue gas 17 are collected, and the absorbent 21 falls while purifying the flue gas 17.

In the counter flow column 19, because the flue gas 17 containing sulfur dioxide moves upward in the region where the particulate absorbing agent slurry ($CaCO_3$) is present, a gas-liquid contact area per volume increases. Furthermore, the flue gas 17 is effectively entrained in the blown-up flow of the absorbent 21. Therefore, the absorbent 21 and the flue gas 17 are effectively mixed, thereby removing remaining sulfur dioxide present in the flue gas 17.

Mist entrained in the flue gas 17 after being brought into counter-flow contact with the absorbent 21 is removed by a mist eliminator or the like provided in the upper part of the counter flow column 19, and the clean flue gas 17 is discharged from the discharge opening 24 at the top of the column as the treated flue gas 23, reheated as required, and discharged from a stack.

In the present embodiment, the absorbent 21 is sprayed upward in a form of a liquid column from each nozzle 14 installed in the parallel flow column 18 and the counter flow column 19. However, the present invention is not limited thereto, and the absorbent 21 can be showered from each nozzle 14 toward a lower part of the column.

Meanwhile, fine bubbles generated by the air feed device 31 are blown into the absorbent 21 stored in the storage tank 20, and the absorbent 21 comes in contact with the air and is oxidized, thereby generating gypsum. The absorbent 21 is replenished to the storage tank 20 from the absorbent feeding means 13 so that the absorbent 21 in the storage tank 20 is maintained at a required level, and the absorbent 21 dropped to the bottom of the parallel flow column 18 and the counter flow column 19 is stored in the storage tank 20.

The alkaline-agent feeding means 15 feeds an alkaline-agent containing solution 44 containing an alkaline agent into the storage tank 20 of the desulfurization absorber 11. The alkaline-agent feeding means 15 includes an alkaline-agent-containing solution tank 45 for storing therein the alkaline-agent containing solution 44, and an alkaline-agent-containing solution feed line 46 for feeding the alkaline-agent containing solution 44 to the storage tank 20. The alkaline-agent containing solution 44 in the alkaline-agent-containing solution tank 45 is fed to the storage tank 20 via the alkaline-agent-containing solution feed line 46 by an alkaline-agent-containing solution feed pump 47. By feeding the alkaline-agent containing solution 44 to the storage tank 20, reactivity of the absorbent slurry contained in the absorbent 21 can be increased and the desulfurization performance can be improved. An adjusting valve V12 is provided in the alkaline-agent-containing solution feed line 46, so that a feed amount of the alkaline-agent containing solution 44 to be fed into the storage tank 20 is adjusted by the adjusting valve V12.

The alkaline agent includes, for example, sodium hydroxide (NaOH), sodium sulfate ($Na_2(SO_4)$), potassium hydroxide (KOH), potassium sulfate ($K_2(SO_4)$), calcium hydroxide ($Ca(OH)_2$), magnesium hydroxide ($Mg(OH)_2$), magnesium sulfate ($Mg_2(SO_4)$), and ammonium sulfate ($(NH_4)_2(SO_4)$). Among these materials, it is preferable to use NaOH, which has high basicity. As the alkaline agent, plural agents such as NaOH, MgOH and the like can be used.

A calcium-carbonate concentration meter 50 for measuring the concentration of carbonate ions in the absorbent 21 can be provided in the desulfurization absorber 11. By measuring the concentration of carbonate ions in the absorbent 21 in the storage tank 20 by the calcium-carbonate concentration meter 50, changes in improvement of the reactivity of the absorbing agent can be continuously measured by injecting the absorbent 21.

The absorbent 21 in the storage tank 20 is extracted by the circulation pump 26, is fed to the feed pipe 27, the circulation header 28, the connecting pipe 29, and the spray pipe 12, circulates in the storage tank 20, the parallel flow column 18, and the counter flow column 19, and is used for purifying the flue gas 17. Therefore, the absorbing agent slurry in the absorbent 21 in the storage tank 20 is in such a state that gypsum and a small amount of limestone as the absorbing agent are suspended or dissolved. The gypsum-containing absorbent 21, which has been circulated and used, is discharged from the desulfurization absorber 11 via an absorbent discharge pipe 51.

An adjusting valve V13 is provided in the absorbent discharge pipe 51, so that a discharge amount of the absorbent 21 to be discharged from the desulfurization absorber 11 is adjusted by the adjusting valve V13. The discharge amount of the absorbent 21 to be discharged from the desulfurization absorber 11 to the absorbent discharge pipe 51 is adjusted based on an amount of gas in the flue gas 17 to be fed to the desulfurization absorber 11, gas temperature, properties of gas, a discharge regulation value, and the capacity of a waste-water treatment facility.

The absorbent 21 is discharged by a slurry extraction pump 52 and fed to a gypsum separator 53. The absorbent 21 is filtered by the gypsum separator 53, and a solid content having low moisture (generally having a moisture content of about 10%) is drawn out. The drawn solid content is dehydrated, to recover gypsum 54.

Meanwhile, filtrate 55 from the gypsum separator 53 is fed to a filtrate tank 56. The filtrate 55 extracted by a filtrate extraction pump 57 passes through the waste-water discharge pipe 16 and is discharged as waste water 58.

A filtrate circulation line 61 for extracting a part of the filtrate 55 is connected to the waste-water discharge pipe 16. The filtrate circulation line 61 connects the waste-water discharge pipe 16 to an absorbent adjustment tank 62 for storing therein the extracted filtrate 55. A part of the filtrate 55 is extracted to the filtrate circulation line 61 and fed to the absorbent adjustment tank 62. Limestone 64 is added to the absorbent adjustment tank 62 along with makeup water 63, to adjust the absorbent 21. The absorbent 21 is fed again into the storage tank 20 by an absorbent feed pump 65.

An adjusting valve V14 is provided in the filtrate circulation line 61, so that a feed amount of the filtrate 55 to be fed into the absorbent adjustment tank 62 is adjusted by the adjusting valve V14.

A flowmeter 71 for measuring a flow amount of the waste water 58 is provided in the waste-water discharge pipe 16. A measurement result obtained by the flowmeter 71 is transmitted to a control device 72.

The control device 72 adjusts an aperture of the adjusting valve V12 based on the measurement result obtained by the flowmeter 71, thereby adjusting a feed amount of the alkaline-agent containing solution 44 based on a discharge amount of the waste water 58. It is preferable to continuously feed the alkaline-agent containing solution 44 so as to maintain predetermined desulfurization performance (for example, a predetermined regulation value) in the desulfurization absorber 11.

The amount of the absorbent 21 fed into the storage tank 20 is adjusted according to the discharge amount of the waste water 58. Because the discharge amount of the absorbent 21 can be obtained from the discharge amount of the waste water 58, the feed amount of the absorbent 21 to the storage tank 20 can be adjusted so that the concentration of the absorbing agent in the absorbent 21 becomes constant. Specifically, as the discharge amount of the filtrate 55 discharged as the waste water 58 increases, the absorbing agent in the absorbent 21 discharged along with the waste water 58 increases by that amount. Therefore, the concentration of the absorbing agent in the absorbent 21 in the storage tank 20 decreases. Accordingly, in this case, a liquid measure of the alkaline-agent containing solution 44 to be newly fed to the storage tank 20 needs to be increased to increase the concentration of the absorbing agent in the absorbent 21 in the storage tank 20. On the other hand, as the discharge amount of the filtrate 55 discharged as the waste water 58 decreases, the absorbing agent in the absorbent 21 discharged along with the waste water 58 decreases by that amount. Therefore, the concentration of the absorbent in the absorbent 21 in the storage tank 20 is maintained at a high level. Accordingly, in this case, the liquid measure of the alkaline-agent containing solution 44 to be newly fed to the storage tank 20 can be a small amount, and the concentration of the absorbing agent in the absorbent 21 in the storage tank 20 is maintained at a high level.

Therefore, by feeding the alkaline-agent containing solution 44 to the desulfurization absorber 11 based on the discharge amount of the waste water 58, the concentration of the absorbing agent in the absorbent 21 in the storage tank 20 can be adjusted to be constant, and the activity of the absorbing agent slurry in the absorbent 21 in the storage tank 20 can be increased to maintain desulfurization performance higher than a predetermined regulation value (for example, a value higher than the predetermined regulation value by several percent).

In a conventional flue gas desulfurization, injection of an NaOH solution or the like is performed by a batch method, and at the time of injecting the NaOH solution or the like, the NaOH solution or the like has been added excessively so that desulfurization performance considerably higher than the predetermined regulation value is achieved so as not to require addition thereof for a predetermined period after injection of the NaOH solution or the like. Meanwhile, in the flue gas desulfurization 10 according to the present embodiment, the alkaline-agent containing solution 44 is fed to the desulfurization absorber 11 based on the discharge amount of the waste water 58, to increase the activity of the absorbing agent slurry in the absorbent 21 in the storage tank 20, thereby maintaining the desulfurization performance higher than the predetermined regulation value (for example, a value higher than the predetermined regulation value by several percent).

Therefore, according to the flue gas desulfurization 10 of the present embodiment, because the feed amount of the alkaline-agent containing solution 44 can be adjusted based on the discharge amount of the waste water 58, the alkaline-agent containing solution 44 can be appropriately fed to the desulfurization absorber 11 according to the discharge amount of the waste water 58 so that the predetermined desulfurization performance (for example, the predetermined regulation value) is maintained, without excessively feeding the alkaline-agent containing solution 44 into the storage tank 20. Accordingly, an increase in the operation cost of a plant can be suppressed.

Figure 3:
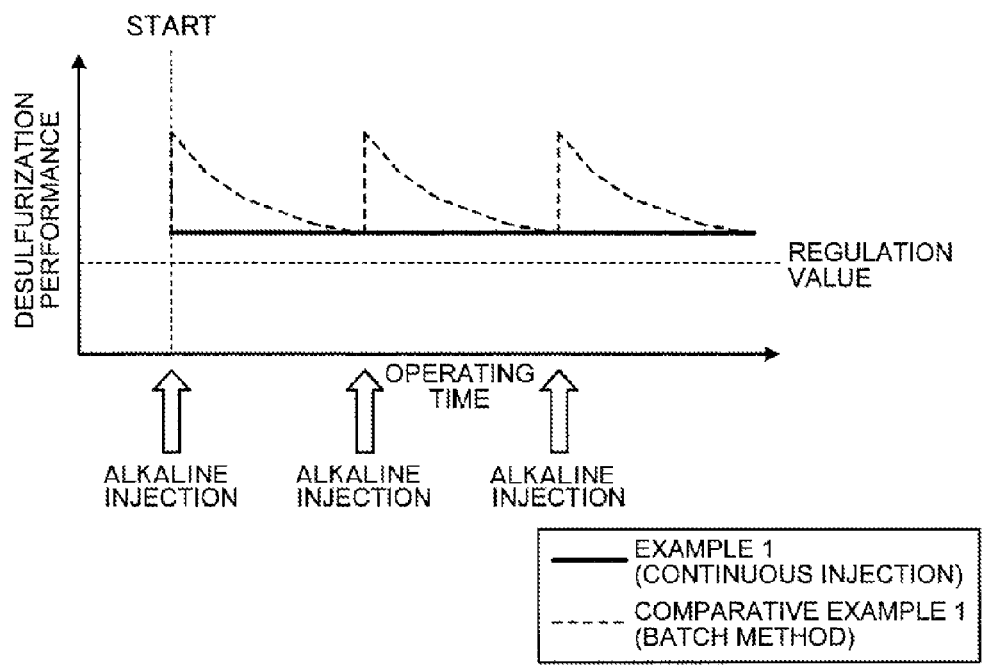
FIG. 3 is an explanatory diagram of an example of desulfurization performance.
Figure 4:
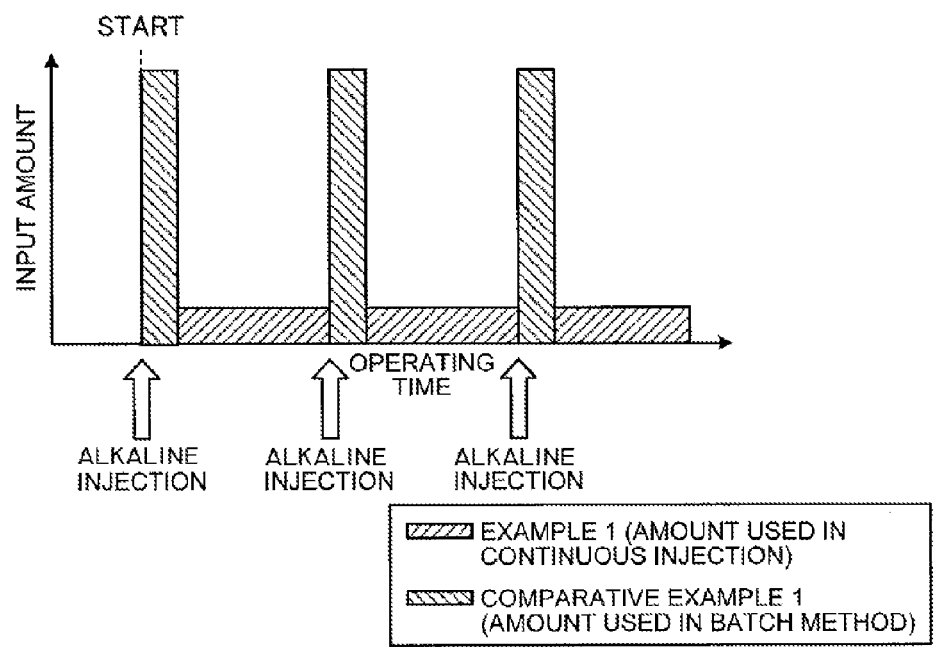
FIG. 4 is an explanatory diagram of an example of an input mount of NaOH at a certain time period.

FIG. 3 is an explanatory diagram of an example of desulfurization performance, and FIG. 4 is an explanatory diagram of an example of an input mount of NaOH at a certain time period. As shown in FIG. 3, the desulfurization performance can be maintained constant by continuously feeding the alkaline-agent containing solution 44 based on the discharge amount of the waste water 58 (see Example 1 in FIG. 3). However, if the alkaline-agent containing solution 44 is injected according to the batch method, the desulfurization performance increases at an initial stage of injection of the alkaline-agent containing solution 44, but decreases with a passage of time, and after the desulfurization performance decreases up to near the regulation value, the alkaline-agent containing solution 44 is injected again (see Comparative example 1 in FIG. 3). Therefore, as shown in FIG. 4, feed of the alkaline-agent containing solution 44 in a minimal amount for satisfying the regulation value is sufficient by continuously feeding the alkaline-agent containing solution 44 based on the discharge amount of the waste water 58, and thus the input amount of the alkaline-agent containing solution 44 to be used decreases at a certain time period (see the Example 1 in FIG. 3). On the other hand, when the alkaline-agent containing solution 44 is injected according to the batch method, because the alkaline-agent containing solution 44 is excessively injected at the time of injection so that the desulfurization performance is stably maintained above the regulation value even if the desulfurization performance decreases, the input amount of the alkaline-agent containing solution 44 to be used at a certain time period increases (see the Comparative example 1 in FIG. 3).

Therefore, by continuously feeding the alkaline-agent containing solution 44 based on the discharge amount of the waste water 58, the reactivity of the absorbing agent can be improved while appropriately adjusting the amount of the absorbent 21 fed into the storage tank 20, thereby enabling to maintain constant desulfurization performance. Furthermore, the consumption amount of the alkaline-agent containing solution 44 to be used during the operation can be reduced.

The feed amount of the absorbent 21 to be fed into the storage tank 20 can be adjusted based on the moisture content of the gypsum 54 as well as the discharge amount of the waste water 58.

A chlorine-ion concentration meter 73 for measuring the concentration of chlorine ions (Cr) in the absorbent 21 can be provided in the desulfurization absorber 11. The flue gas 17 is generated due to combustion of coal, and if chlorine is contained in the coal, chlorine ions may be mixed in the flue gas 17, and chlorine ions may be contained in the absorbent 21. Chlorine ions inhibit an effect of the alkaline agent for improving the reactivity of an absorbing agent (limestone), and therefore, when chlorine ions are contained in the absorbent 21, it is preferable to feed the alkaline-agent containing solution 44 to the desulfurization absorber 11 while taking into consideration the ratio of suppressing the effect of improving the reactivity of the absorbing agent (limestone) by the chlorine ions. Accordingly, by measuring the concentration of chlorine ions in the absorbent 21 in the storage tank 20 by the chlorine-ion concentration meter 73, the reactivity of the absorbing agent (limestone) can be efficiently improved by the alkaline agent.

In the present embodiment, the chlorine-ion concentration meter 73 for measuring the concentration of chlorine ions in the absorbent 21 is provided in the desulfurization absorber 11. However, the present invention is not limited thereto, and the concentration of chlorine or chlorine ions needs only to be measured, and an electric-conductivity measuring instrument can be used, for example. Furthermore, the measurement is not limited to that of the concentration of chlorine ions in the absorbent 21. Because chlorine ions in the absorbent 21 result from chlorine in the coal, chlorine in the flue gas 17 flowing into the desulfurization absorber 11 or chlorine in the coal can be measured.

As described above, the flue gas desulfurization 10 according to the present embodiment can improve the limestone reactivity efficiently and stably, reduce the operation cost of a thermal power plant or the like, and improve purification performance of the flue gas 17. That is, according to the flue gas desulfurization 10 of the present embodiment, by feeding the alkaline-agent containing solution 44 to the desulfurization absorber 11 based on the discharge amount of the waste water 58, the activity of the absorbing agent slurry in the absorbent 21 in the storage tank 20 can be increased. As a result, the alkaline-agent containing solution 44 can be appropriately fed to the storage tank 20 without excessive feed, thereby enabling to maintain constant desulfurization performance higher than a predetermined regulation value (for example, a value higher than a predetermined regulation value by several percent), and to reduce the amount of the alkaline-agent containing solution 44 to be used during the operation. Accordingly, desulfurization and dust removal can be performed stably and efficiently, while reducing the operation cost of a plant.

In the present embodiment, the desulfurization absorber 11 is provided in the flue gas desulfurization 10, and the desulfurization absorber 11 has a configuration in which the lower parts of the parallel flow column 18 and the counter flow column 19 are connected to each other by the storage tank 20. However, the present invention is not limited to this configuration, and it also suffices that only one desulfurization absorber 11 is provided.

REFERENCE SIGNS LIST

10 flue gas desulfurization
11 desulfurization absorber
12 spray pipe
13 absorbent feeding means
14 nozzle
15 alkaline-agent feeding means
16 waste-water discharge pipe
17 flue gas
18 parallel-flow desulfurization absorber (parallel flow column)
19 counter-flow desulfurization absorber (counter flow column)
20 storage tank
21 absorbent
22 introduction opening
23 treated flue gas
24 discharge opening
26 circulation pump
27 feed pipe
28 circulation header
31 air feed device
32 hollow rotation shaft
33 motor (drive unit)
34 arm
35 air feed pipe
36 rotary joint
41 limestone tank
42 absorbent feed line
44 alkaline-agent containing solution
45 alkaline-agent-containing solution tank
46 alkaline-agent-containing solution feed line
47 alkaline-agent-containing solution feed pump
50 calcium-carbonate concentration meter
51 absorbent discharge pipe
52 slurry extraction pump
53 gypsum separator
54 gypsum
55 filtrate
56 filtrate tank
57 filtrate extraction pump
58 waste water
61 filtrate circulation line
62 absorbent adjustment tank
63 makeup water
64 limestone
65 absorbent feed pump
71 flowmeter
72 control device
73 chlorine-ion concentration meter

The invention claimed is:

1. A flue gas desulfurization system comprising:
a desulfurization absorber that removes sulfur oxide and dust contained in flue gas;
spray pipes that are provided horizontally in the desulfurization absorber, with one end of the spray pipes being closed;

an absorbent feeding unit that is connected to the other end of the spray pipes to feed an absorbent containing an absorbing agent slurry, in which limestone is used as an absorbing agent, into the desulfurization absorber;

nozzles that are provided in the spray pipe to spray the absorbent into the desulfurization absorber;

an alkaline-agent feeding unit that feeds a solution containing an alkaline agent into the desulfurization absorber;

a solid-liquid separator that separates filtrate from an absorbent discharged from the desulfurization absorber;

a waste-water discharge pipe for discharging filtrate as waste water; and a flowmeter for measuring a discharge amount of the waste water in the waste-water discharge pipe, wherein a feed amount of the solution containing the alkaline agent into the desulfurization absorber is adjusted based on the discharge amount of the waste water measured by the flowmeter.

* * * * *